United States Patent
Wong et al.

(10) Patent No.: US 7,122,765 B2
(45) Date of Patent: Oct. 17, 2006

(54) ELECTRIC OVEN

(75) Inventors: Wai Ming Raymond Wong, New Territories (CN); Kong Leong Tay, New Territories (CN)

(73) Assignee: Electrical & Electronics Ltd., Hong Kong (CN)

( * ) Notice: Subject to any disclaimer, the term of this patent is extended or adjusted under 35 U.S.C. 154(b) by 0 days.

(21) Appl. No.: 11/287,593

(22) Filed: Nov. 28, 2005

(65) Prior Publication Data

US 2006/0131296 A1  Jun. 22, 2006

(30) Foreign Application Priority Data

Nov. 29, 2004 (EP) .................... 04257377

(51) Int. Cl.
*A21B 1/02* (2006.01)
*A21B 3/00* (2006.01)
*F27B 3/14* (2006.01)
*F27D 1/10* (2006.01)

(52) U.S. Cl. .................. 219/391; 219/408; 126/39 M; 126/22

(58) Field of Classification Search .............. 126/39 M
See application file for complete search history.

(56) References Cited

U.S. PATENT DOCUMENTS

| 2,912,559 | A | * | 11/1959 | Kirschke | ..................... 219/395 |
| 2,944,139 | A | * | 7/1960 | Harris, Jr. et al. | ......... 219/413 |
| 3,036,193 | A | * | 5/1962 | Allen, Jr. | ..................... 219/391 |
| 3,151,608 | A | * | 10/1964 | Hurko | ..................... 126/19 R |
| 4,307,285 | A | * | 12/1981 | DeRemer | ..................... 219/392 |
| 6,225,603 | B1 | * | 5/2001 | Wai | ..................... 219/391 |
| 6,960,742 | B1 | * | 11/2005 | Wei | ..................... 219/391 |

* cited by examiner

*Primary Examiner*—Joseph Pelham
(74) *Attorney, Agent, or Firm*—Alix, Yale & Ristas, LLP

(57) ABSTRACT

A self-supporting removable box-like liner for use in an electric oven that has a heating element supported in a plane and extending across a cooking chamber from one said side wall to the other. The liner has an open the front, a pair of liner side walls and a back wall, and an elongate aperture extending across the back wall and continuing along each liner side wall toward the front to pass over and receive the heating element such that the liner can be inserted into the chamber for use and completely removed for cleaning, without removal of the heating element from the oven.

6 Claims, 2 Drawing Sheets

ELECTRIC OVEN

FIELD OF THE INVENTION

The invention relates to electric ovens. The invention relates more particularly to electric ovens with removable liners. It is known to provide removable liners that are supported in place inside an oven chamber and removed for cleaning. See for example U.S. Pat. No. 4,307,285 and UK Patent No. 2,104,211. See also for example European Patent Application No. 00303503.7 to the present applicant in which there is disclosed an electric oven comprising a removable liner having a narrow slot in its back wall to pass over a heating element 14 that extends forwardly from the back of the oven into the cooking compartment through the slot. Such an arrangement is not useful for toaster ovens, broilers or other ovens in which the heating elements extend across the cooking compartment from one side thereof to the other. Moreover, the design is suited only for ovens having forward-extending heating elements over which the narrow slot in the back wall of the removable liner can pass upon removal and reinsertion of the liner from/to the oven.

OBJECT OF THE INVENTION

It is an object of the invention to overcome or substantially ameliorate this problem.

DISCLOSURE OF THE INVENTION

There is disclosed herein an electric oven comprising a box-like chamber having an open front and a pair of side walls, a heating element supported in a plane and extending across the chamber from one said side wall to the other, an open fronted self-supporting removable box-like liner which slides through the open front into and fits inside the chamber, the liner having an open front, a pair of liner side walls and a back wall, characterised by an elongate aperture extending across the back wall and continuing along each liner side wall toward the front to pass over and receive the heating element such that the liner can be inserted into the chamber for use and completely removed for cleaning, without removal of the heating element from the oven.

Preferably, each liner side wall is comprises guides to support a removable shelving platform.

Preferably, at least inner surfaces of the liner are at least partially covered by non-stick material.

There is further disclosed herein a self-supporting removable box-like liner for use in an electric oven that has a heating element supported in a plane and extending across a cooking chamber from one said side wall to the other, the liner having an open front, a pair of liner side walls and a back wall, and an elongate aperture extending across the back wall and continuing along each liner side wall toward the front to pass over and receive the heating element such that the liner can be inserted into the chamber for use and completely removed for cleaning, without removal of the heating element from the oven.

BRIEF DESCRIPTION OF DRAWINGS

An electric oven and removable liner according to the invention will now be described by way of example with reference to the accompanying drawings in which.

DESCRIPTION OF PREFERRED EMBODIMENTS

Figure 1:
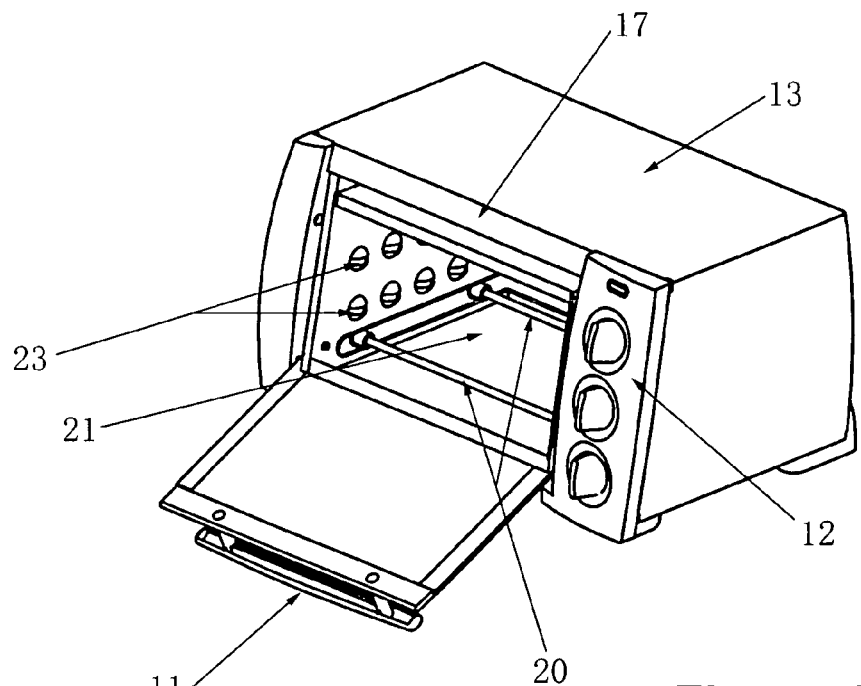
FIG. 1 is perspective illustration of an oven having a liner installed in its cavity.

Referring to the drawings, in FIG. 1 a toaster oven broiler 10 has a bottom hinged door 11 with a handle 12 and manual control dials 13. The oven 10 has two upper horizontal heating elements 19 and two lower horizontal heating elements 20 that are supported at and extend between respective side walls of the oven across a cooking space. The heating elements 19 and 20 are parallel to one another.

An open fronted self-supporting removable box-like liner 16 fits slidably into the chamber 15 and rests on a base 18 of the chamber 15.

The liner 16 is provided with two elongate slots 27 and 28 that extend the whole way across the rear wall and then continue forward along each side wall of the liner to receive the heating elements 19 and 20 respectively and allow the liner 16 to slide into and out of the chamber 15 as required.

Opposite inside surfaces of the liner 16 are integrally formed with two pairs of upper and lower guides or slide ways 25 and 26 to receive respective removable shelving platforms. One shelving platform 27 is shown in FIG. 2 and is composed of joined-together wire strands having a conventional structure known and used in present day ovens as shelving platforms.

Figure 2:
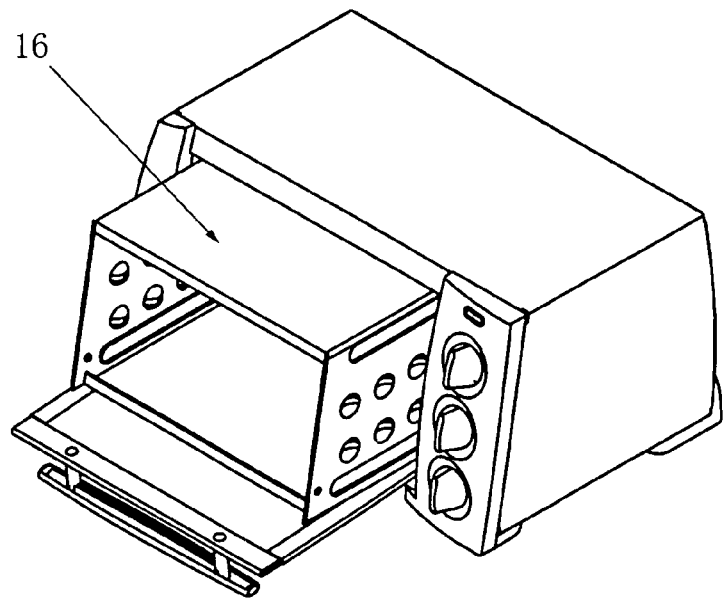
FIG. 2 is a perspective illustration of the oven of FIG. 1, with its liner partially removed.
Figure 3:
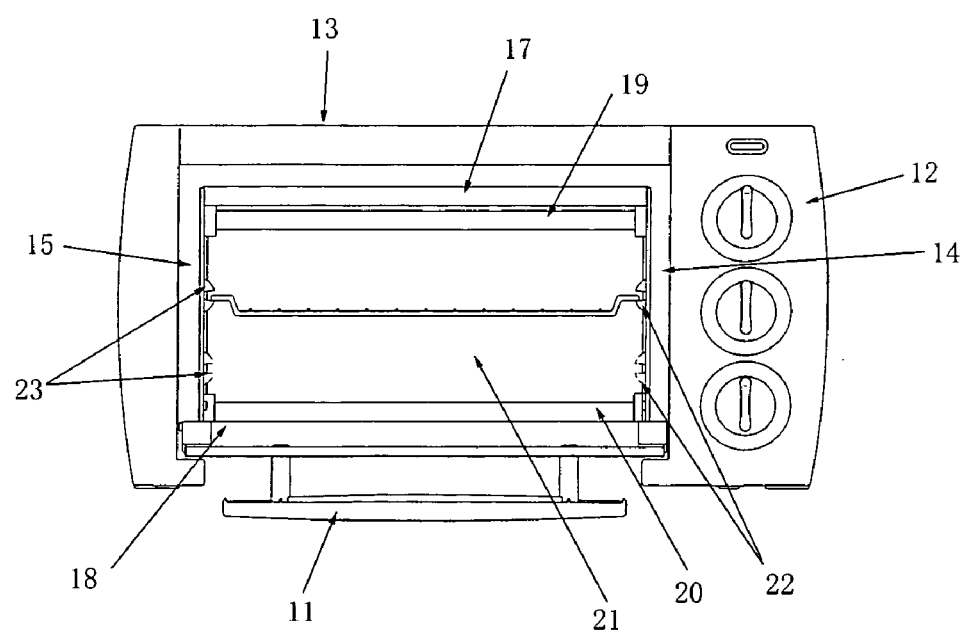
FIG. 3 is a front view of the oven of FIGS. 1 and 2.

The liner 16 is partially removed in FIG. 2. It will be appreciated that the liner which is made of suitable planar sheets of material that are formed and shaped as required and fixed together, forms a self-supporting structure that can be completely removed from the oven 10. As such the liner 16 can be taken to a washing station and, as the liner 16 is totally free of electrical components, be washed in a dish washer if preferred.

The liner 16 covers substantially the whole of the inside of the chamber 15 in use and therefore the chamber 15 itself normally requires no cleaning. This contrasts with removable liners in current use that, broadly stated, do not completely protect the inside surfaces of the oven from cooking contamination and so require cleaning once those liners are removed.

The slots 27 and 28 are designed to fit snugly against a surface provided in the chamber 15 when the liner 16 is fully inserted into the chamber 15 so that little or no hot air escapes into the chamber 15 behind the liner 16 in use.

The liner 16 is preferably at least partially coated, on its inner and/or outer surfaces, with non-stick or self-cleaning materials. The liner 16 may also be provided with integrally formed handles or finger grips, to aid the inserting and removal of the liner 16 into the chamber 15, if desired.

It is envisaged that the oven 10 may have another or a different side that is open, such as the top side, through which the liner 16 is slidable into or out of the oven 10.

The heating elements 19 and 20 may be vertical instead of horizontal.

The slide ways 25 and 26 may be formed on the top side (instead of the left and right sides as described) of the liner 16, for supporting a generally U-shaped removable shelving platform.

The invention has been given by way of example only, and various other modifications of and/or alterations to the described embodiment may be made by persons skilled in the art without departing from the scope of the invention as specified in the appended claims.

The invention claimed is:

1. An electric oven comprising a box-like chamber having an open front and a pair of side walls, a heating element supported in a plane and extending across the chamber from the one said side wall to the other, an open fronted self-supporting removable box-like liner which slides through the open front into and fits inside the chamber, the liner having a front, a pair of liner side walls and a back walls characterized by an elongate aperture extending across the back wall and continuing along each liner side wall toward the front to pass over and receive the heating element such that the liner can be inserted into the chamber for use and completely removed for cleaning, without removal of the heating element from the oven.

2. An electric oven according to claim 1, in which each liner side wall comprises guides to support a removable shelving platform.

3. An electric oven according to claim 1, in which at least inner surfaces of the liner are at least partially covered by non-stick material.

4. A self-supporting removable box-like liner for use in an electric oven that has a heating element supported in a plane and extending across a cooking chamber from one said side wall to the other, the liner having a front, a pair of liner side walls and a back wall, and an elongate aperture extending across the back wall and continuing along each liner side wall toward the front to pass over and receive the heating element such that the liner can be inserted into the chamber for use and completely removed for cleaning, without removal of the heating element from the oven.

5. A liner according to claim 4, in which each liner side wall comprises guides to support a removable shelving platform.

6. An electric oven according to claim 2, in which at least inner surfaces of the liner are at least partially covered by non-stick material.

* * * * *